W. T. CAMPBELL.
CORN CUTTER.
APPLICATION FILED MAR. 22, 1916.
1,276,324.
Patented Aug. 20, 1918.
3 SHEETS—SHEET 2.
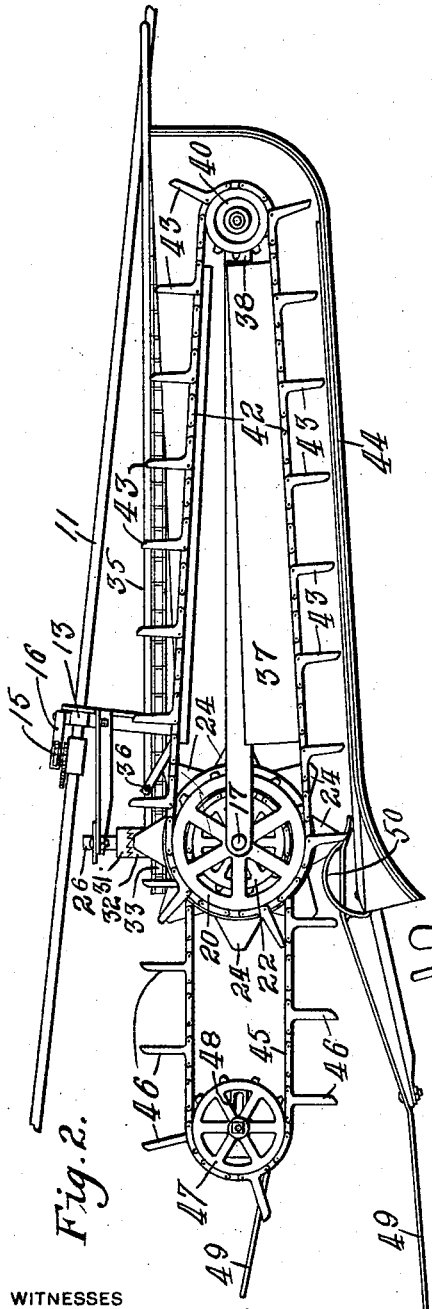
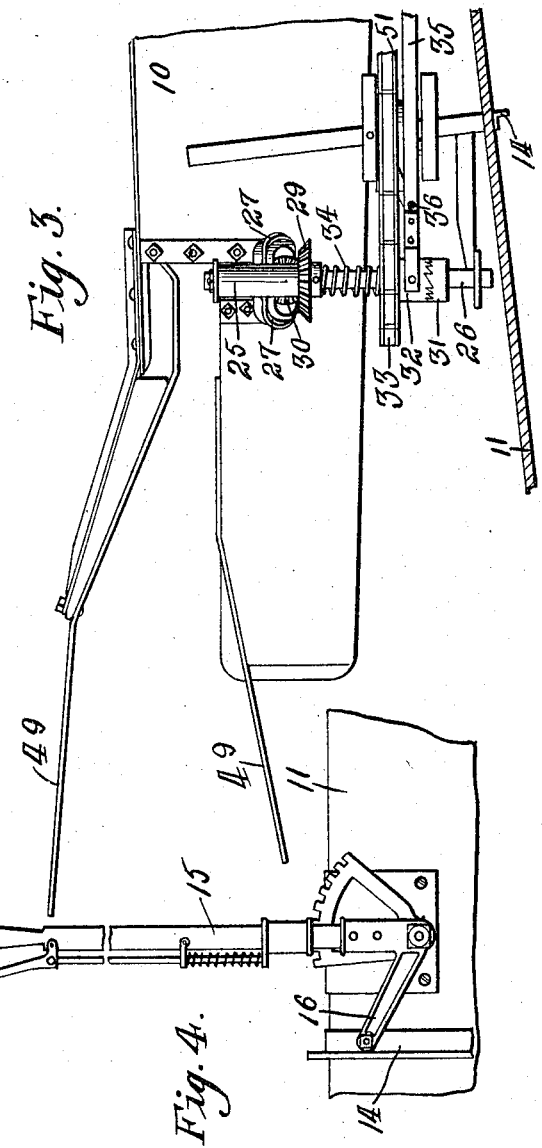
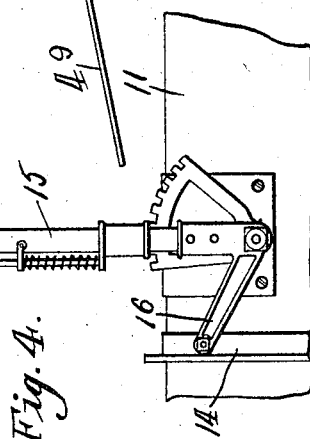
INVENTOR
William T. Campbell.
WITNESSES
BY
ATTORNEY W. T. CAMPBELL.
CORN CUTTER.
APPLICATION FILED MAR. 22, 1916
1,276,324.
Patented Aug. 20, 1918.
3 SHEETS—SHEET 3.
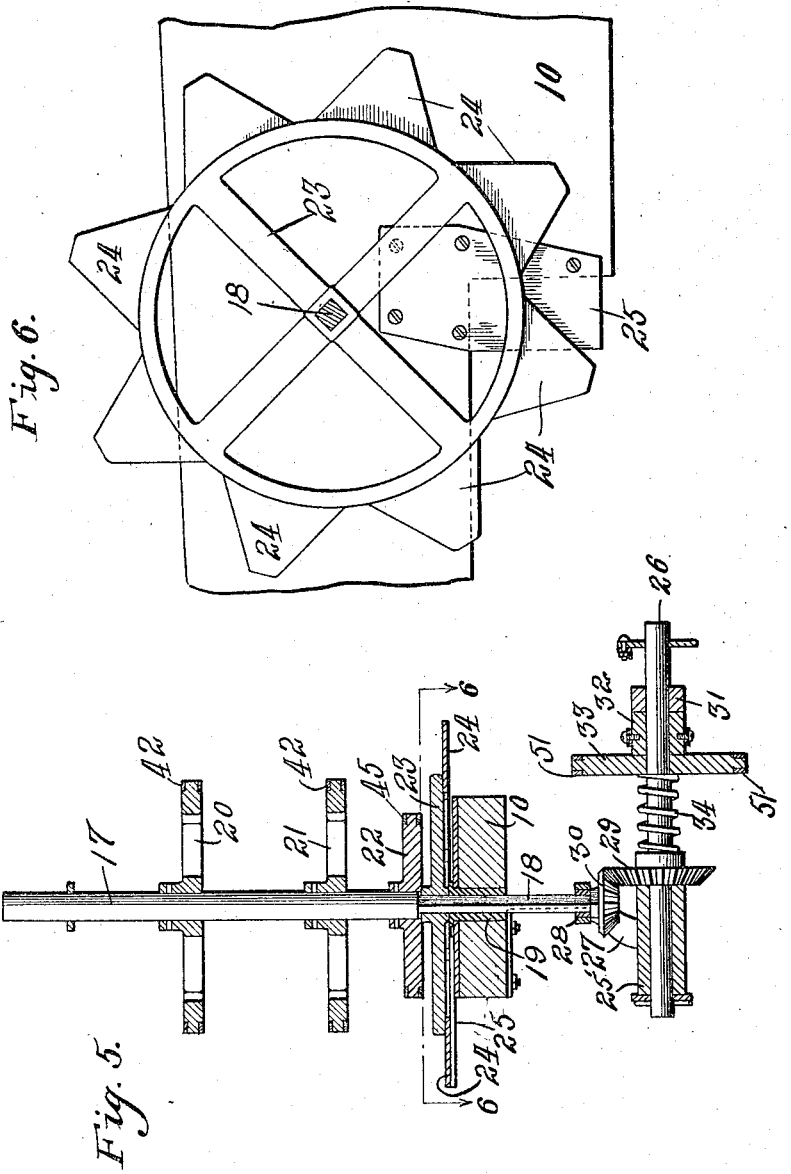
WITNESSES
Roland T. Williams
Ross J. A. Woodward
INVENTOR
William T. Campbell
BY Richard Owen.
ATTORNEY

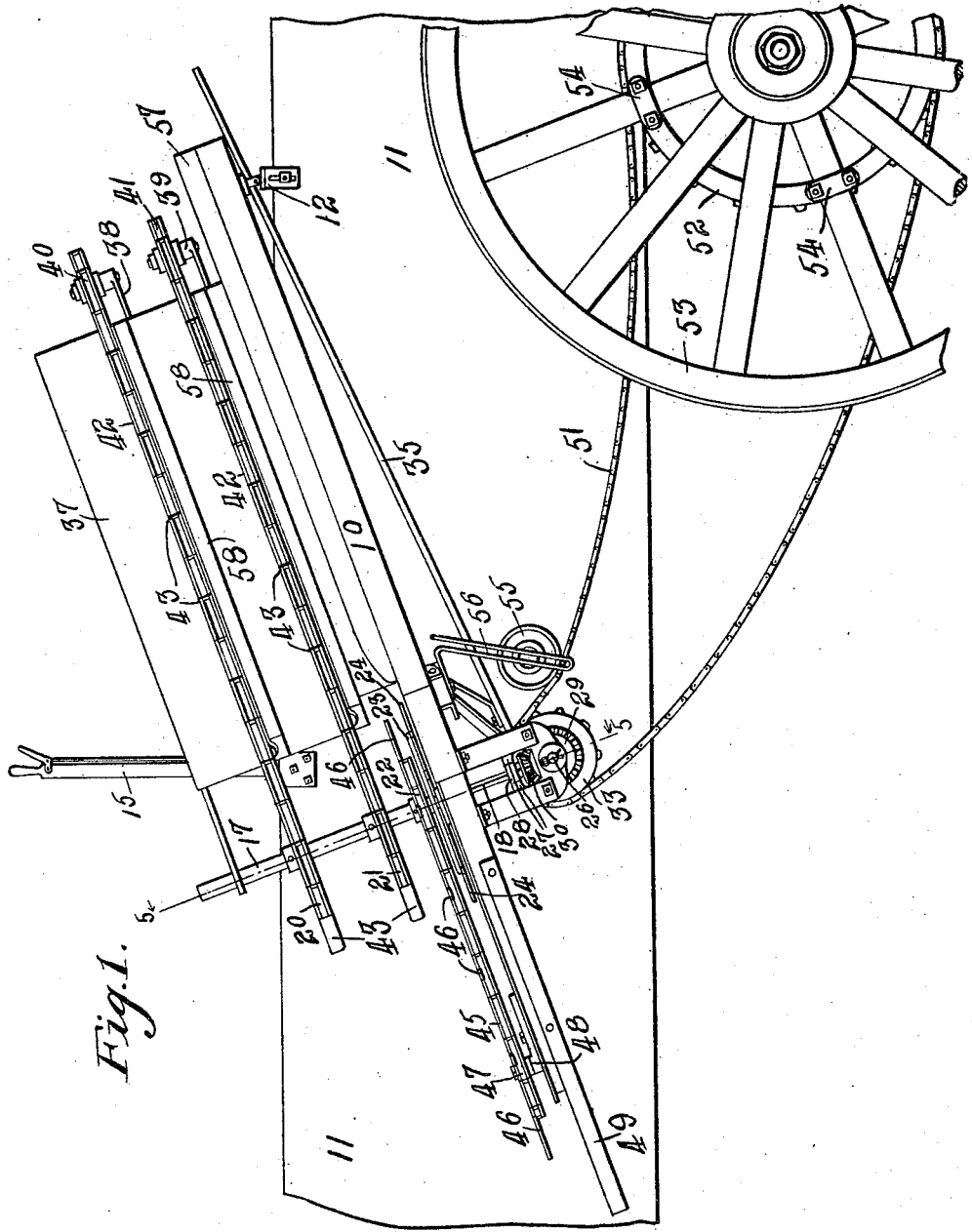

UNITED STATES PATENT OFFICE.

WILLIAM T. CAMPBELL, OF WILSEY, KANSAS.

CORN-CUTTER.

1,276,324.  Specification of Letters Patent.  Patented Aug. 20, 1918.

Application filed March 22, 1916. Serial No. 85,902.

*To all whom it may concern:*

Be it known that I, WILLIAM T. CAMPBELL, a citizen of the United States, residing at Wilsey, in the county of Morris and State of Kansas, have invented certain new and useful Improvements in Corn-Cutters, of which the following is a specification.

This invention relates to an improved device for cutting Kafir corn and the principal object of the invention is to provide a corn cutter so constructed that it may be connected with a wagon box and adjusted thereon to cut the corn at the proper height, the driving shaft of the cutter being rotated through the medium of a sprocket chain passing around a sprocket wheel secured to one of the wagon wheels.

Another object of the invention is to so construct this corn cutter that the corn will be guided into engagement with the arms of the feeding chain and held in tight engagement with the cutting knife and to further so construct this machine as to bring the cut corn into engagement with the arms of the conveyer chain as the corn is being cut, the conveyer chain carrying the cut corn above the wagon box and depositing the same in the wagon.

Another object of the invention is to so construct this cutter that it may be easily and quickly removed or transferred to a new wagon and to further so construct the device that its operation may be controlled and thus the cutter prevented from operating when traveling from one field to another.

This invention is illustrated in the accompanying drawings, wherein:—

Figure 1 is a view in side elevation showing the cutter connected with a wagon.

Fig. 2 is a top plan view of the cutter.

Fig. 3 is a bottom plan view of the cutter.

Fig. 4 is fragmentary view in side elevation showing the adjusting lever for vertically adjusting the cutter.

Fig. 5 is a vertical sectional view taken along the line 5—5 of Fig. 1.

Fig. 6 is a fragmentary sectional view taken along the line 6—6 of Fig. 5.

The frame or base-board 10 of this machine is pivotally connected with the side wall 11 at its upper end by means of the hinge bracket 12 and is provided with a hanger bracket 13 which engages the wall 11 and has its arm 14 extending down the inner face of this wall as shown in Fig. 4. A latch lever 15 is connected with this wall 11 and is provided with an arm 16 similar to the arm of a bell-crank lever so that when the latch lever is moved from the position shown in Fig. 4 toward the right, the bracket 13 will be moved upwardly and thus the forward end portion of this cutter raised. As the hinge bracket 12, hanger bracket 13 and latch lever 15 are the supports for the cutter, it will be readily seen that when it is desired to remove this cutter from the wagon, this can be very readily done by simply removing the securing screws of the bracket 12 and lever 15. Therefore the device can be attached to the ordinary farm wagon used and does not need a special type of vehicle. A driven shaft 17 is provided with a squared lower end portion 18 extending through the base-board 10 from a point shortly above the base-board, a bushing or bearing sleeve 19 being provided in the base-board 10 so that this shaft 17 can rotate freely. Above the base-board 10 there has been provided sprocket wheels 20 and 21 for conveyer chains to be hereinafter described, a smaller sprocket wheel 22 beneath the sprocket wheel 21 and a wheel or disk 23 having cutting knives 24 carried thereby. As this shaft rotates, the cutting knives 24 will pass across the cutting edge of the cutting blade 25 secured to the base-board 10 and the corn stalks will be cut through. A sleeve 25' is mounted upon the driving shaft 26 and carries arms 27 connected by a bearing 28 in which the lower portion of the shaft 17 is rotatably mounted. A gear 29 which is rigidly mounted upon the driving shaft 26 meshes with a gear 30 carried by the shaft 17 and therefore when the shaft 26 is rotating, rotary movement will be transmitted to the shaft 17.

A clutch 31 is rigidly mounted upon shaft 26 and when engaged by the clutch 32 of the sprocket wheel 33 loosely mounted upon shaft 26, and yieldably held in engagement with the clutch 31 by means of the spring 34, the shaft 26 will be rotated. A shifting lever 35 is pivotally mounted as shown at 36 and extends rearwardly of the cutter to a point where it can be easily reached. Therefore the move of this cutter can be easily controlled and unnecessary wear upon the cutter prevented.

A dividing plate or supporting plate 37 is mounted upon the base-board 10 and carries brackets 38 and 39 for rotatably mounting the sprocket wheels 40 and 41. Sprocket chains 42 and 43 pass around the sprocket wheels 20 and 40 and 21 and 41 and are provided with arms 43 for engaging the corn and conveying the same through the trough formed by the partitions 37 and side plates or walls 44. These chains will hereinafter be referred to as the conveying chains since they engage the corn after it has been cut and convey this cut corn up the trough and deposit the corn into the wagon. A sprocket chain 45 which is provided with arms 46 and passes around the sprocket wheel 22 and around a sprocket wheel 47 carried by the adjustable bracket 48 and constitutes the feeding chain, the arms of which engage the corn and hold the corn in the proper position for cutting. A guiding strip 49 extends from the side wall 44 and engages the corn to guide the same into position for engagement by the arm of the feeding chain. A spring strip 50 is also carried by this side wall and is intended to press the corn stalks toward the cutting knives 24 and 25 and thus insure easy and quick cutting of the stalks to prevent any danger of a stalk becoming caught between the knives and thus preventing the machine from operating.

When this device is in use, the cutter is put in place upon the wagon body as has been previously brought out and the driving chain 51 is then passed around the sprocket wheels 33 and 52, the sprocket wheel 52 being connected with the spokes of the wagon wheel 53 by means of clamps 54. This sprocket chain 51 moves with the sprocket wheel 52 for rotating the sprocket wheel 33 and when the clutch 32 is in engagement with the clutch 31, the machine will operate. A weight or roller 55 is slidably mounted by means of hanger brackets 56, one of which is positioned upon each side of the chain 51 and serves as a belt tightener for placing the chain 51 under proper tension and thus preventing danger of the driving chain slipping. When the corn stalks are cut and are moved up the base board, they rest upon the strip or track 57 and as the sprocket chains 42 and 43 move, between the sprocket wheels, they pass along strip 58. Therefore these chains will be supported for proper action. Upon reaching the upper end of the base board the corn stalks will either fall into the wagon of their own weight or the operator may gather the stalks in bundles as they leave the base board and pile them in the wagon body. Therefore a machine has been provided with which Kafir corn can be easily and quickly cut and at the same time loaded into the wagon either for direct transfer from the field in case only a relatively small quantity of corn is desired or for transfer to some other wagon in case an entire field of corn is to be cut. When the machine is no longer to be used, the cutter can be removed from the wagon body and the sprocket wheel 52 can be removed from the wheel 53. This cutter together with its driving chain 51, sprocket wheel 52 and latch lever 15 can then be put away until again necessary for use, at which time it can be easily and quickly put back in place.

What is claimed is:—

A stalk cutter comprising a base provided at its forward end with a stalk receiving slot, a partition wall extending longitudinally of the base from the inner end of said slot, a side wall extending from the base and co-acting with one side of said partition wall to form a passage-way for the stalk, upper and lower brackets carried by the rear end of said partition wall, sprockets supported by said brackets, a vertical shaft extending through the base adjacent the forward end of the partition wall and arranged upon one side of the inner end of said slot, upper and lower sprockets carried by said shaft in alinement with said first mentioned sprockets, endless conveyers supported by said sprockets and movable through the passageway provided between said outer wall and partition wall, a sprocket mounted on the base at the forward end of the slot, a third sprocket wheel mounted on the shaft at the inner end of said slot, an endless conveyer connecting said last mentioned sprockets and movable along one side of the slot, a stationary cutter extending across the inner end of said slot and a rotary cutting blade carried by said vertical shaft and coöperating with said stationary cutter.

In testimony whereof I affix my signature in presence of two witnesses.

WILLIAM T. CAMPBELL.

Witnesses:
J. H. GAREY,
O. H. BURTON.

Copies of this patent may be obtained for five cents each, by addressing the "Commissioner of Patents, Washington, D. C."